(12) United States Patent  (10) Patent No.: US 11,667,179 B2
Ulcickas  (45) Date of Patent: Jun. 6, 2023

(54) INSULATED CURTAIN FOR VEHICLES

(71) Applicant: Erin Elizabeth Ulcickas, Eugene, OR (US)

(72) Inventor: Erin Elizabeth Ulcickas, Eugene, OR (US)

(*) Notice: Subject to any disclaimer, the term of this patent is extended or adjusted under 35 U.S.C. 154(b) by 0 days.

(21) Appl. No.: 17/494,754

(22) Filed: Oct. 5, 2021

(65) Prior Publication Data
US 2023/0104342 A1  Apr. 6, 2023

(51) Int. Cl.
B60J 11/06 (2006.01)
B60R 13/02 (2006.01)

(52) U.S. Cl.
CPC ........... B60J 11/06 (2013.01); B60R 13/0243 (2013.01)

(58) Field of Classification Search
CPC .. B60J 11/06; B60R 13/0243; B60R 13/0815; B60R 13/01; B60R 2021/0293; B60R 21/026
USPC .......... 296/24.35, 24.41, 24.42, 24.43, 24.45
See application file for complete search history.

(56) References Cited

U.S. PATENT DOCUMENTS

| | | | | |
|---|---|---|---|---|
| 4,065,166 A * | 12/1977 | Shoemaker | ............... | B60P 3/32 296/159 |
| 4,109,957 A | 8/1978 | Polizzi et al. | | |
| 4,457,553 A | 7/1984 | Larkin | | |
| 4,544,195 A * | 10/1985 | Gunn | ..................... | B60P 3/341 160/DIG. 18 |
| 4,938,522 A * | 7/1990 | Herron | .................... | B60J 11/00 150/166 |
| 5,343,915 A * | 9/1994 | Newsome | ................ | B60J 11/00 296/136.02 |
| 5,913,564 A | 6/1999 | Stewart et al. | | |
| 7,201,431 B1 | 4/2007 | Calandruccio | | |
| 7,422,267 B2 | 9/2008 | Curtis, Jr. et al. | | |
| 7,740,300 B2 * | 6/2010 | Marsh | .................... | B60J 5/0487 296/77.1 |
| 8,146,984 B2 * | 4/2012 | Devereaux | ............... | B60J 11/00 296/136.02 |
| 9,834,951 B1 * | 12/2017 | Townley | ................. | E04H 15/08 |
| 2006/0108080 A1 | 5/2006 | Garrigues et al. | | |
| 2013/0276286 A1 * | 10/2013 | Latuff | ..................... | B60J 11/06 29/428 |

FOREIGN PATENT DOCUMENTS

CN  213063424  4/2021
DE  202020102004 U1 * 8/2020

* cited by examiner

Primary Examiner — Joseph D. Pape
Assistant Examiner — Veronica M Shull

(57) ABSTRACT

This invention is directed to a removable insulation curtain for a vehicle. The removable insulation curtain is made of a multi-layered flexible cover and can be used to cover openings in the vehicle, such as side and rear doors. The curtain is secured to the vehicle with removable fasteners around the perimeter of the door openings. The removable insulation curtain has a slot for people to enter and exit the vehicles without taking the curtain off and a window to let in outside light. The slot of removable insulation curtain enables side and rear doors of a vehicle to be used for ingress and egress while the tight fitment around vehicle doors reduces fluctuation of interior temperature relative to ambient temperature.

18 Claims, 4 Drawing Sheets

INSULATED CURTAIN FOR VEHICLES

BACKGROUND

In recent years, camping and living in vehicles have become increasingly popular. Vehicles that were not originally configured with living essentials are often converted to include such requirements. An example of such vehicles is a converted camper van.

A major challenge for converting vehicles with an interior suitable for living is to provide an environment with stable and comfortable temperature. Various types of thermo insulation can be affixed to the vehicle structure for this purpose. However, a vehicle has many necessarily features that make insulation a challenge.

SUMMARY

This invention is directed to a removable insulation curtain for a vehicle. The removable insulation curtain is made of a multi-layered flexible cover and can be used to cover openings in the vehicle, such as side and rear doors. The curtain is secured to the vehicle with removable fasteners around the perimeter of the door openings. The removable insulation curtain has a slot for people to enter and exit the vehicles without taking the curtain off and a window to let in outside light. In one embodiment, the slot in the curtain is vertical and secured with magnetic fasteners such that after a person uses the slot to pass through the curtain, the slot is automatically closed. The slot of removable insulation curtain enables side and rear doors of a vehicle to be used for ingress and egress while the tight fitment around vehicle doors reduces fluctuation of interior temperature relative to ambient temperature. This is especially advantageous in cold weather where heat loss is a major consideration for living in vehicles. The curtain can easily be removed when additional insulation is no longer necessarily or desired, such as in hot weather without interior air conditioning. The removability of the curtain also confers other advantageous, such as ease of installation and quick conversion of the vehicle for non-living purposes.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, and/or components have been described at a relatively high-level, without detail, in order to avoid unnecessarily obscuring aspects of the present teachings.

Figure 1:
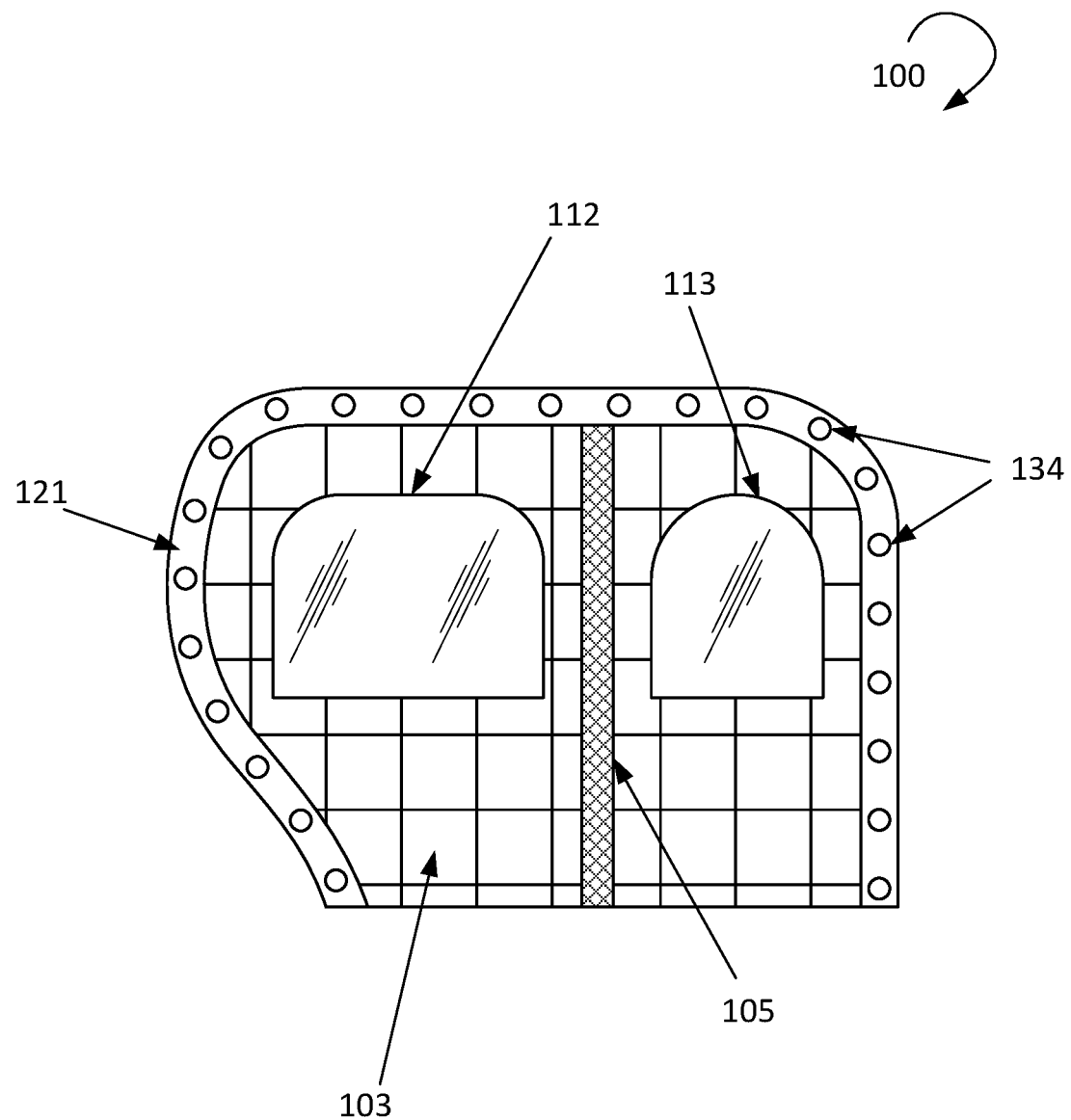
FIG. 1 shows an example removable insulation curtain for a side door of a vehicle.

This invention is directed to a removable insulation curtain for a vehicle. The removable insulation curtain is made of a multi-layered flexible cover and can be used to cover openings in the vehicle, such as side and rear doors. FIG. 1 shows an example removable insulation curtain 100 for a side door of a vehicle, such as a slider door of a van. As shown in FIG. 1, removable insulation curtain 100 includes flexible cover 103, a slot 105, windows 112 and 113, and attachment surface 121. Flexible cover 103 forms the main body of removable insulation curtain 100 and is constructed with a multi-layer fabric with insulation properties. Windows 112 and 113 allow outside light to pass through the curtain to the interior of the vehicle. In the example removable insulation curtain 100, windows 112 and 113 are part of flexible cover 103. Windows 112 and 113 can be constructed of any type of transparent, translucent, and/or see-through materials, such as clear vinyl plastic, mesh, glass, and plexiglass.

In one embodiment, removable insulation curtain 100 includes an insulated cover that can cover windows 112 and 113. The insulated cover is made of materials with insulation properties that can obscure windows 112 and 113, such as for the purpose of preserving privacy and blocking outside light. For example, the insulted cover can be constructed of the same multi-layer fabric as that of flexible cover 103. The insulated cover can be rolled up and secure toward the upper edge of windows 112 and 113.

Slot 105 is a split in flexible cover 103 that enables a person to pass through, such as for vehicle ingress and egress. Magnetic fasteners are incorporated in both sides of slot 105 to close removable insulation curtain 100 by coupling the sides of slot 105. In one embodiment, slot 105 vertically bisects flexible cover 103. In another embodiment, slot 105 is located in a substantially vertical orientation and the magnetic fasteners are configured to automatically couple the sides of slot 105 after opening.

Removable insulation curtain 100 includes attachment surface 121 along the perimeter of flexible cover 103. Attachment surface 121 provides a surface for mating removable insulation curtain 100 with a corresponding surface around the opening of the vehicle door. In one embodiment, attachment surface 121 has a width of between 1 inch to 3 inches. Attachment surface 121 includes mechanical fasteners 134 that can removably attach removable insulation curtain 100 to the opening of the vehicle door. Mechanical fasteners 134 can be any type of mechanical removable fasteners, such as snap fasteners, magnetic fasteners, Velcro, hook and grommet, and strap and buckles.

Removable insulation curtain 100 can be configured with a shape that matches the opening of the vehicle door that removable insulation curtain 100 is intended to cover. So, when attached with mechanical fasteners 134, removable insulation curtain 100 tightly covers the opening of the vehicle door to reduce heat loss while people can still enter and exit the vehicle through slot 105. Even though insulation curtain 100 was shown and described as configured to fit a side door of a vehicle, it is to be understood that insulation curtain 100 can be similarly configured to fit a rear door and other doors of a vehicle.

Figure 2:
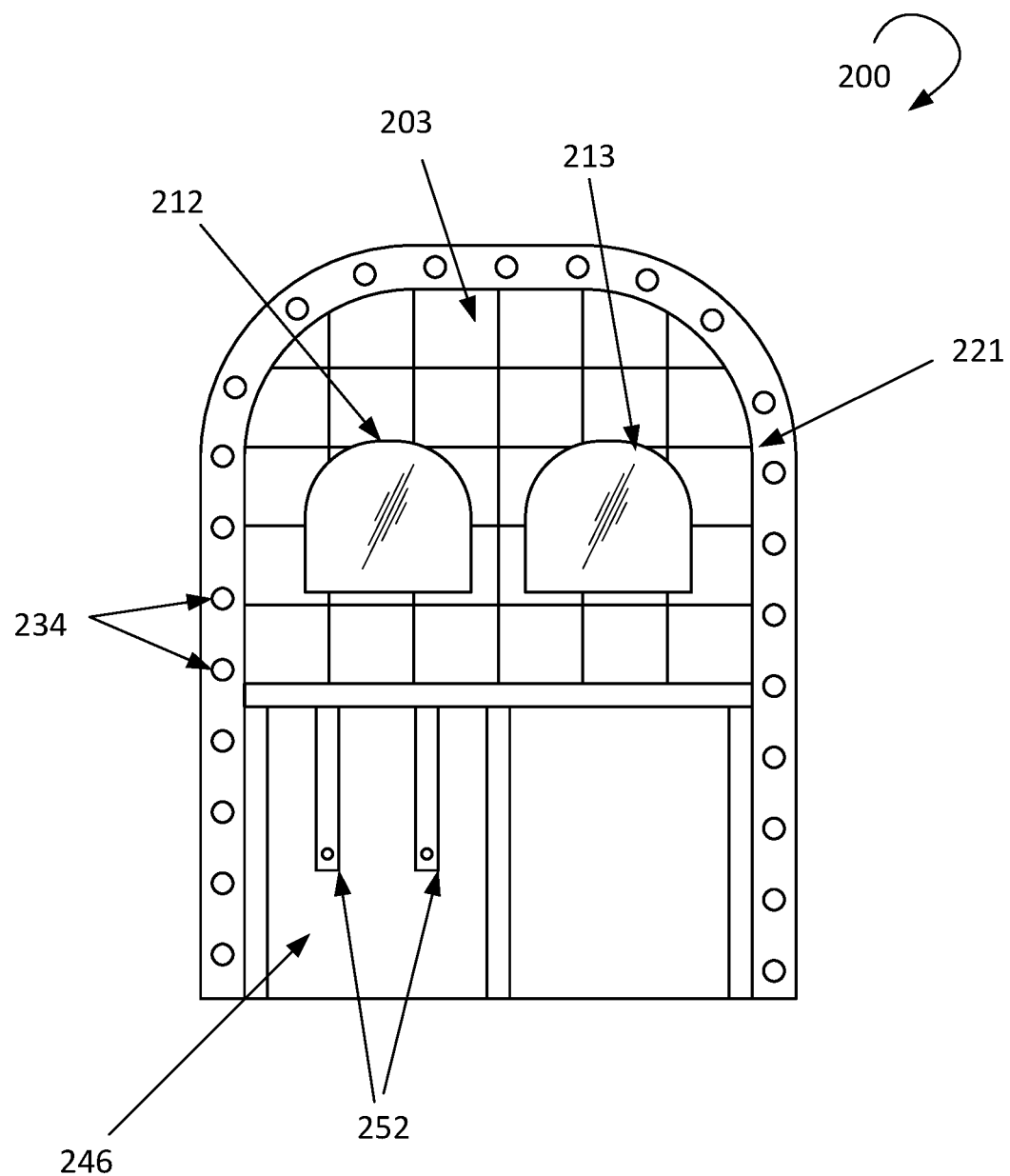
FIG. 2 shows an example removable insulation curtain for a rear door of a vehicle.

FIG. 2 shows an example removable insulation curtain 200 for a rear door of a vehicle, such as rear clamshells door of a van. Like removable insulation curtain 100 in FIG. 1, removable insulation curtain 200 includes flexible cover 203, windows 212 and 213, and attachment surface 221 with mechanical fasteners 234. Removable insulation curtain 200 also includes rollable section 246 incorporated in flexible cover 203. Rollable section 246 includes strap fasteners 252 that can retain rollable section 246 in a rolled-up position. Rollable section 246 enables access of items inside the vehicle while removable insulation curtain 200 is in a fastened configuration, such as for retrieving items stored inside the vehicle from the outside.

Figure 3:
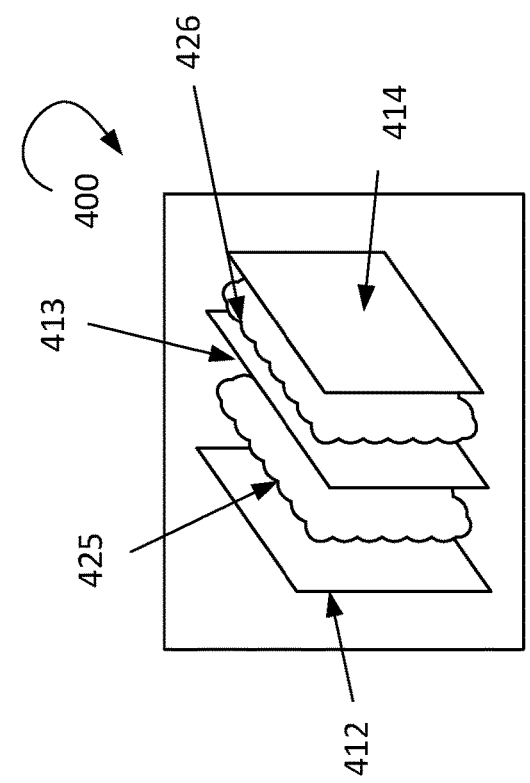
FIG. 3 shows an example construction of a flexible cover.

FIG. 3 shows an example construction of flexible cover 103. In this embodiment, flexible cover 103 includes an outside-facing layer 313, an inside-facing layer 319, and an inner layer 316. Outside-facing layer 313 is the layer of flexible cover 103 that faces the exterior environment. Outside-facing layer 313 can be constructed of any flexible materials, such as fabric that is appropriate for outdoor use. Example of flexible materials for outside-facing layer 313 includes water-resistant fabric, insulation blanket, nylon ripstop, synthetic leather, natural leather, and polyester. In one embodiment, the outside-facing layer 313 is constructed with multi-layer insulation fabric.

Inside-facing layer 319 is the layer of flexible cover 103 that faces the interior of the vehicle. Inside-facing layer 319 can be constructed of any flexible materials, such as water-resistant fabric, insulation blanket, nylon rip stop, synthetic leather, natural leather, and polyester. Inner layer 316 is the layer of flexible cover 103 that provides the majority of thermo insulation of removable insulation curtain 100. Inner layer 316 can be constructed of any materials with thermo insulation properties, such as metallic insulation, poly-fill, fiberglass, mineral wool, cellulose, natural fiber, and polystyrene foam.

Figure 4:
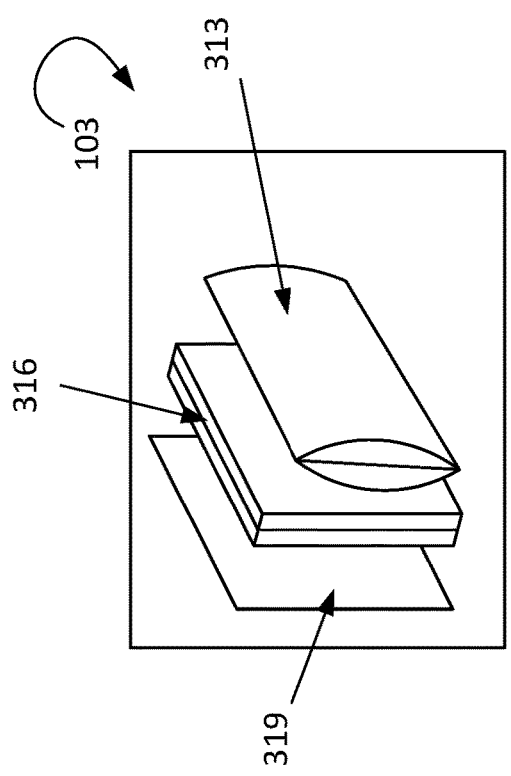
FIG. 4 shows an example insulation blanket that can be used for a layer of a flexible cover.

FIG. 4 shows an example insulation blanket 400 that can be used for a layer of flexible cover 103. Insulation blanket 400 includes insulation layers 425 and 426, and divider layers 412, 413 and 414. In one embodiment, insulation layers 425 and 426 can be constructed of poly-fill. In another embodiment, divider layers 412,413, and 414 can be constructed of nylon ripstop fabric.

Figure 5:
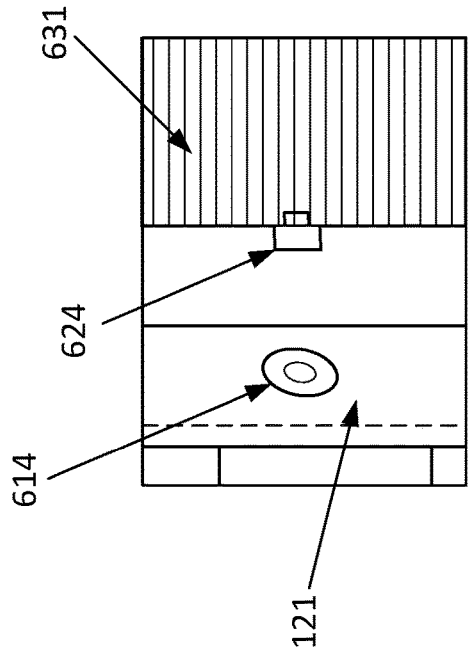
FIG. 5 shows a close-up view of example magnetic fasteners for securing a slot in a removable insulation curtain.
Figure 6:
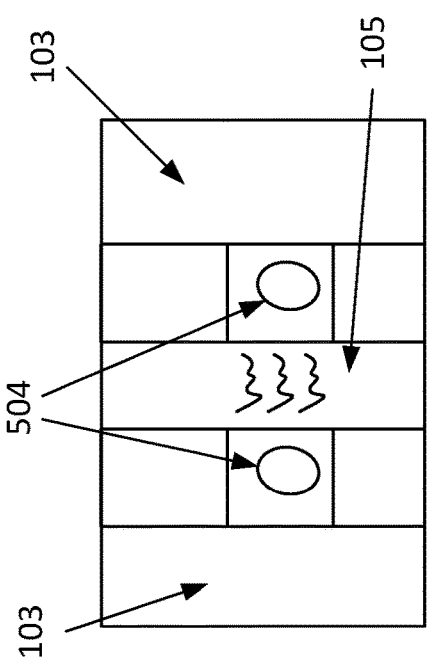
FIG. 6 shows a close-up view of example mechanical fasteners for securing a removable insulation curtain to a vehicle.

FIG. 5 shows a close-up view of example magnetic fasteners 504 for securing slot 105. Magnetic fasteners 504 are secured to flexible cover 103 on both sides of slot 105 and automatically close slot 105 after separated. FIG. 6 shows a close-up view of example mechanical fasteners for securing removable insulation curtain 100 to a vehicle. Mechanical fastener 614 is incorporated in attachment surface 121. Mechanical fastener 624 is attached to vehicle body 631 so that removing insulation curtain 100 is attached to the door opening when mechanical fasteners 614 and 624 coupled. In one embodiment, mechanical fastener 624 is a snap fastener riveted to the vehicle body 631.

Figure 7:
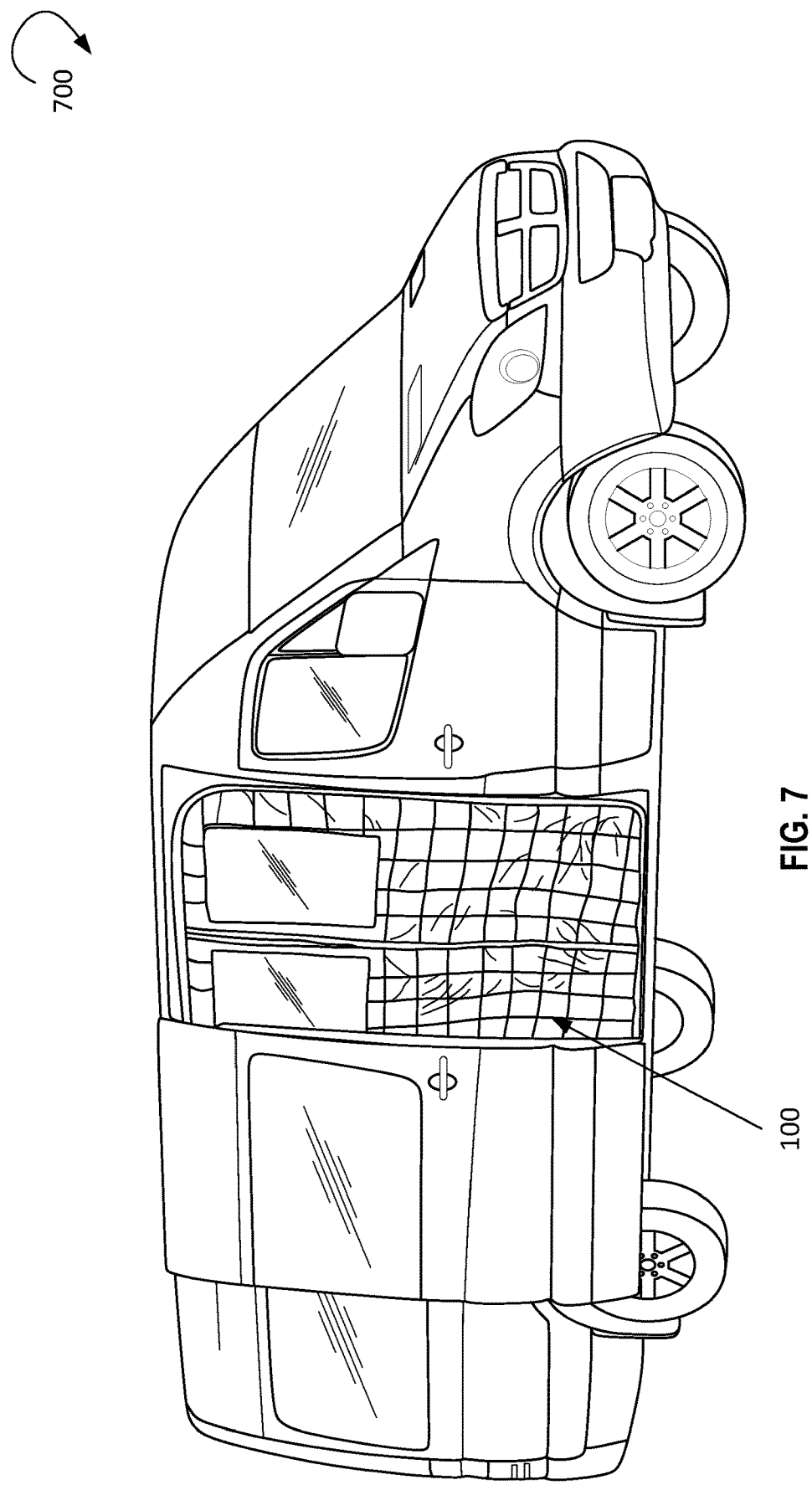
FIG. 7 shows an example vehicle with a removable insulation curtain.

FIG. 7 shows an example vehicle with a removable insulation curtain 100. As shown in the FIG. 7, removable insulation curtain 100 is installed over the sliding side door. Removable insulation curtain 100 provides both insulation and privacy despite the sliding door being opened. A person can enter and exit the vehicle through slot 105 without removing removable insulation curtain 100 in full or in part.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A removable insulating curtain for a vehicle comprising:
a flexible cover having an outside-facing layer, an inside-facing layer, and an inner layer;

a slot in the flexible cover, the slot having magnetic fasteners that are configured to removably couple sides of the slot;

a window that allows ambient light to pass through; and an attachment surface along a perimeter of the flexible cover, the attachment surface having mechanical fasteners that are configured to removably attach the insulating curtain to the vehicle;

wherein the outside-facing layer includes two layers of poly-fill sandwiched between three layers of nylon ripstop.

2. The removable insulating curtain of claim 1, wherein the slot is located in a substantially vertical orientation and the magnetic fasteners are configured to automatically couple the sides of the slot after opening.

3. The removable insulating curtain of claim 1, wherein the slot vertically bisects the flexible cover.

4. The removable insulating curtain of claim 1, further comprising an insulated cover that is configured to substantially cover the window.

5. The removable insulating curtain of claim 4, wherein the insulated cover is configured to be rolled up and secured toward an upper edge of the window.

6. The removable insulating curtain of claim 1, wherein the attachment surface has a width of between 1 inch to 3 inches.

7. The removable insulating curtain of claim 1, wherein the window is made from at least one type from a group comprising clear vinyl plastic, mesh, glass, and plexiglass.

8. The removable insulating curtain of claim 1, wherein the outside-facing layer is made from at least one material selected from a group comprising water-resistant fabric, insulation blanket, nylon ripstop, synthetic leather, natural leather, and polyester.

9. The removable insulating curtain of claim 1, wherein the inside-facing layer is made from at least one material selected from a group comprising water-resistant fabric, insulation blanket, nylon ripstop, synthetic leather, natural leather, and polyester.

10. The removable insulating curtain of claim 1, wherein the inner layer is made from at least one material selected from a group comprising metallic insulation, poly-fill, fiberglass, mineral wool, cellulose, natural fiber, and polystyrene foam.

11. The removable insulating curtain of claim 1, wherein the mechanical fasteners include at least one type from a group comprising, snap fasteners, magnetic fasteners, Velcro, hook and grommet, and strap and buckles.

12. A vehicle comprising:
a door;
a jamb surface adjacent to the door; and
an insulating curtain removably covering the opening toward interior of the vehicle comprising:
  a flexible cover having an outside-facing layer, an inside-facing layer, and an inner layer;
  a slot in the flexible cover, the slot having magnetic fasteners that are configured to removably couple sides of the slot;
  a window that allows ambient light to pass through; and
  an attachment surface along a perimeter of the flexible cover, the attachment surface having mechanical fasteners that are configured to removably attach the insulating curtain to the jamb surface;
  wherein the outside-facing layer includes two layers of poly-fill sandwiched between three layers of nylon ripstop.

13. The vehicle of claim 12, wherein the slot is located in a substantially vertical orientation and the magnetic fasteners are configured to automatically couple the sides of the slot after opening.

14. The vehicle of claim 12, wherein the slot vertically bisects the flexible cover.

15. The vehicle of claim 12, further comprising an insulated cover that is configured to substantially cover the window.

16. The vehicle of claim 15, wherein the insulated cover is configured to be rolled up and secured toward an upper edge of the window.

17. The vehicle of claim 12, wherein the attachment surface has a width of between 1 inch to 3 inches.

18. A removable insulating curtain for a vehicle comprising:
a flexible cover having an outside-facing layer, an inside-facing layer, and an inner layer;
a rollable section in the flexible cover, the rollable section having strap fasteners that are configured to retain the rollable section in a rolled-up position;
a window that allows ambient light to pass through; and
an attachment surface along a perimeter of the flexible cover, the attachment surface having mechanical fasteners that are configured to removably attach the insulating curtain to the vehicle;
wherein the outside-facing layer includes two layers of poly-fill sandwiched between three layers of nylon ripstop.

* * * * *